United States Patent
Cohen (10) Patent No.: US 7,817,755 B2
(45) Date of Patent: Oct. 19, 2010

(54) SYSTEM, DEVICE AND METHOD FOR GENERATING A LOGARITHMIC FUNCTION ACCORDING TO A PLURALITY OF COMMUNICATION SIGNALS

(76) Inventor: Hanan Cohen, Tzur 12, Matan 45858 (IL)

( * ) Notice: Subject to any disclaimer, the term of this patent is extended or adjusted under 35 U.S.C. 154(b) by 833 days.

(21) Appl. No.: 11/681,829

(22) Filed: Mar. 5, 2007

(65) Prior Publication Data

US 2008/0220734 A1 Sep. 11, 2008

(51) Int. Cl.
- H04B 1/10 (2006.01)
- H03D 1/04 (2006.01)
- H03D 1/06 (2006.01)
- H03K 5/01 (2006.01)
- H04L 1/00 (2006.01)
- H04L 25/08 (2006.01)
- H04K 1/02 (2006.01)
- H04L 25/03 (2006.01)
- H04L 25/49 (2006.01)

(52) U.S. Cl. ......... 375/349; 375/296; 375/346
(58) Field of Classification Search ......... 375/349, 375/346, 296
See application file for complete search history.

(56) References Cited

U.S. PATENT DOCUMENTS

| | | | | |
|---|---|---|---|---|
| 3,858,036 A | | 12/1974 | Lunsford | 708/605 |
| 4,182,993 A | * | 1/1980 | Tyler | 330/279 |
| 4,531,235 A | | 7/1985 | Brusen | 455/273 |
| 4,536,788 A | * | 8/1985 | Naimpally | 348/711 |
| 4,791,380 A | * | 12/1988 | Chiappetta | 329/352 |
| 5,319,264 A | * | 6/1994 | Kimura | 327/352 |
| 5,523,875 A | | 6/1996 | Morris | 398/209 |
| 5,526,058 A | * | 6/1996 | Sano et al. | 348/647 |
| 5,603,112 A | | 2/1997 | Gabato et al. | 455/226.2 |
| 5,734,389 A | * | 3/1998 | Bruce et al. | 342/68 |
| 6,917,791 B2 | | 7/2005 | Chadwick | 455/126 |
| 7,130,601 B2 | | 10/2006 | Khorram | 455/226.2 |
| 7,212,798 B1 | * | 5/2007 | Adams et al. | 455/251.1 |
| 7,345,618 B1 | * | 3/2008 | Cole et al. | 342/22 |
| 2003/0145269 A1 | * | 7/2003 | Kuo et al. | 714/749 |
| 2003/0163264 A1 | * | 8/2003 | Garreau et al. | 702/66 |
| 2004/0161030 A1 | | 8/2004 | Mohindra et al. | 375/235 |
| 2004/0207473 A1 | * | 10/2004 | Denoyer et al. | 330/308 |
| 2007/0129034 A1 | * | 6/2007 | Adams et al. | 455/138 |
| 2008/0197930 A1 | * | 8/2008 | Esguevillas et al. | 330/297 |

FOREIGN PATENT DOCUMENTS

EP  1143611  10/2001

* cited by examiner

*Primary Examiner*—David C Payne
*Assistant Examiner*—Erin M File
(74) *Attorney, Agent, or Firm*—Martin Fleit; Paul D. Bianco; Fleit Gibbons Gutman Bongini & Bianco PL (57) ABSTRACT

The present invention discloses a log function generator module device that is adapted to receive substantially simultaneously a plurality of signals at a plurality of respective communication links. The device includes a plurality of sets of logarithmic, a plurality of substantially linear amplifiers, a plurality of negative-value-eliminator (NVE) modules, a plurality of preliminary adders, a plurality of limiters and one final adder all of which are associated with each other a manner such that the output of the final adder is a final signal that substantially corresponds to a logarithm of the sum of the square of each of the received signals, thereby providing a received signal strength indication (RSSI) of the plurality of received signals.

1 Claim, 6 Drawing Sheets

SYSTEM, DEVICE AND METHOD FOR GENERATING A LOGARITHMIC FUNCTION ACCORDING TO A PLURALITY OF COMMUNICATION SIGNALS

FIELD OF THE INVENTION

Generally, the present invention relates to the architecture of receivers and/or a method for operating of receivers. More specifically, the present invention relates to architecture of receivers and/or methods for operating said receivers to enable estimating received signal strength indication according to said received signals.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying figures, wherein.

The drawings together with the description make apparent to those skilled in the art how the invention may be embodied in practice.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

BACKGROUND OF THE INVENTION

Communication stations such as, e.g., laptop computers; handheld devices like mobile phones, personal digital assistants (PDA) and the like; personal computers (PC) and the like, include components such as transmitters and receivers whose operating parameters are adjustable to compensate for variations in operating parameters such as signal transmission requirements, received signal strength and the like.

Typically, a log function generator module is employed whose output of an approximated logarithmic function corresponds, inter alia, to an estimation of received signal strength indication (RSSI). The log function generator module may approximate the logarithmic function by first determining the amplitude of each received signal and/or signal component and by subsequent conversion of the measured amplitude into a power level value by, e.g., suitable piecewise approximation.

However, estimating the RSSI is difficult in direct conversion receivers, which are receivers that include only one mixing stage and directly convert received radio frequency (RF) signals to baseband signals. The difficulty in estimating the RSSI arises when a frequency offset is present, i.e., when the local oscillation of the receiver does not match the local oscillation of the transmitting component. Thus, the above-mentioned log function approximation(s) are not suitable for direct conversion receivers. Moreover, such approximation (s) are time-consuming and therefore decrease the operational reliability of the communication stations. Correspondingly, power consumption in a communication station employing a log function generator module performing said approximation(s) is inefficient. Efficient power consumption is of particular importance in portable, typically battery-powered communication stations because of the limited availability of power in these communication stations.

Figure 1:
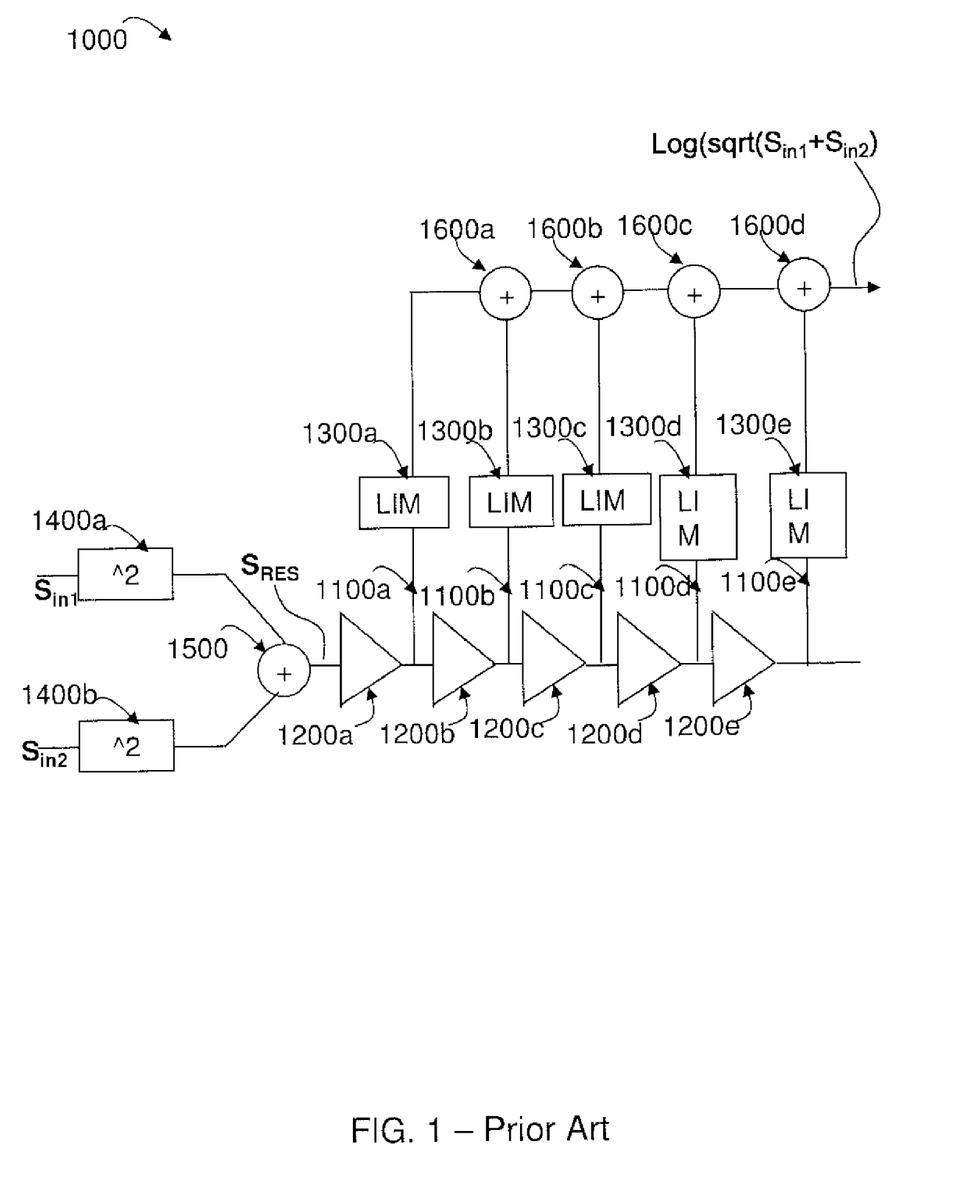
FIG. 1 is a schematic block diagram illustration of a log function generator module adapted to approximate a logarithm of the root-mean-square (RMS) of the power of a plurality of signals received at a communication station, as known in the art.

Turning now to FIG. 1, a log function generator module 1000 is schematically shown, which is adapted to approximate a logarithm of the root-mean-square (RMS) of the power for a plurality of signals. The log function generator module 1000 employs an SDLA architecture adapted to receive a plurality of signals. For exemplary purposes only, the plurality of signals is hereinafter referred to as signals $S_{in1}$ and $S_{in2}$.

Respective squaring modules 1400a and 1400b, which may be implemented by squaring circuits, square the signals $S_{in1}$ and $S_{in2}$. The purpose of the squaring signals is to substantially eliminate negative values in signals $S_{in1}$ and $S_{in2}$.

Upon performing squaring of respective signals $S_{in1}$ and $S_{in2}$, said signals may be summed up by adder 1500. The resulting signal $S_{res}$ is then successively amplified by amplifiers 1200a-e. In order to obtain at the output of module 1000 a signal that substantially corresponds to the function Log (sqrt($S_{in1}^2+S_{in2}^2$)), piecewise-linear approximation is performed by summing the signals at the substantially equally weighted taps 1100a-e. More specifically, piecewise-linear approximation may be accomplished by first limiting the signals at the outputs of the substantially equal amplifiers 1200a-e with limiters 1300a-e, respectively. The signals at the output of limiters 1300a-e may then be summed up by adders 1600a-d. The output of the last adder 1600d substantially corresponds to the Log(sqrt($S_{in1}^2+S_{in2}^2$)). It is to be understood that module 1000 may include other SDLA architectures known in the art. For example, a single adder may sum up all the signals at the outputs of limiters 1300a-e.

The SDIA architecture of module 1000 suffers, inter alia, from the following drawbacks: Signals $S_{in1}$ and $S_{in2}$ may each have a wide dynamic range, and with today's integrated circuit (IC) technology, it is not very feasible to design squaring circuits that are accurate enough to be able to process signals that have wide dynamic ranges.

The single-ended configuration of the output of adder 1500 renders the output of adder 1500 prone to DC mismatch, which may limit the dynamic range of the signal $S_{res}$. In consequence, adder 1500, and squaring modules 1400a and 1400b may have to be calibrated.

Signals such as $S_{in1}$ and $S_{in2}$ might suffer from static direct current (DC) offset. Since the squaring of signals (e.g., $S_{in1}$ and $S_{in2}$) is a non-linear function, the squared signals may have DC components that are undistinguishable from the static DC offset. In consequence, squaring renders the removal of static DC offset impossible. Therefore, static DC offset of the signals should be eliminated before said signals enter squaring modules 1400a and 1400b. Hence, additional circuitry may be needed before squaring modules 1400a and 1400b.

The signals at the output of squarer modules 1400a and 1400b will have frequency components that are substantially double the frequency components incorporated in $S_{in1}$ and $S_{in2}$. Therefore, any signal processing stage subsequent to squarer modules 1400a and 1400b must be performed at a relatively high speed. Correspondingly, power consumption of subsequent signal processing stages is increased. The following equation schematically demonstrates how squaring of a signal of interest such as, e.g., A+Bsin(ωt) effects DC components as well as double frequency components:

$$[A + B\sin(\omega t)]^2 =$$
$$A^2 + AB\sin(\omega t) + B^2\sin^2(\omega t) = A^2 + AB\sin(\omega t) + \frac{1}{2}B^2 + \frac{1}{2}B^2\cos(2\omega t)$$

wherein "A" and "B" represent the DC offset and the amplitude of the signal of interest, respectively, and wherein. "ω" is the angular frequency and "t" the time in seconds of said signal of interest, respectively. While the DC components $A^2$ and $0.5 B^2$ can be eliminated, there is no practical way to eliminate the second component, which may mix with other signals at a frequency of ω/2, hence generating an error with respect to the required signal.

The said SDLA architecture may be employed for each communication link separately such that an alternative power estimation can be obtained. However, the alternative power estimation generates a final signal that corresponds to a logarithmic function of the form $\log(S_{in1})+\log(S_{in2})$. The final signal largely depends on the properties of signals $S_{in1}$ and $S_{in2}$. Hence, employing the SDLA architecture for each communication link separately renders the alternative power estimation prone to significant errors.

Several attempts have been made so far that partly try to solve the abovementioned problems.

U.S. Pat. No. 7,130,601, which is incorporated by reference in its entirety herein, discloses determination of a received signal strength indication in a direct conversion receiver. The determination begins at a given time, a 1.sup.st value to be the larger of the in-phase component of the received signal and the quadrature component of the received signal. The direct conversion received then determines a 2. sup.nd value at the given time to be the smaller of the in-phase component of the received signal and the quadrature component of the received signal. As such, at a given time, the I .sup.st and 2. sup.nd values correspond to the greater and lesser of the in-phase component and quadrature component, respectively. Having obtained these values, the direct conversion receiver then determines the received signal strength indication based on the 1. sup.st value, the 2. sup.nd value and an offset value. The offset value provides a scaling of the RSSI value based on the range of the RSSI values. However, the received signal strength is determined by relying on the fact that the signals are correlated.

U.S. Pat. No. 3,858,036, which is incorporated by reference in its entirety herein, discloses a method that compares two signals that indicate two values, which are compared to produce a signal depending on the relative magnitudes of the values. The signal representing the relative magnitudes controls a scaler which divides the lesser of the by values by two and the greater, by one. The resulting quotients are summed in an adder. However, the two signals are not converted into a logarithmic scale.

U.S. Pat. No. 5,603,112, which is incorporated by reference in its entirety herein, discloses calculating received signal strength in a radio by hardware, which scales the absolute value of components of the received signal in a linear fashion by using two scaling factors. However, the received signal strength is determined by relying on the fact that components of the signal are correlated to each other.

U.S. Pat. No. 4,531,235, which is incorporated by reference in its entirety herein, discloses in one embodiment a diversity signal strength indicator for transmission site selection in a cellular-like mobile radio system to produce an output strength indication signal that is proportional to the logarithm of the average strength of two diversity input signals. The two input diversity signals are time-multiplexed together to form a composite signal, and a log amplifier/envelope detector then produces an intermediate log signal, which is proportional to the logarithm of the envelope of the composite signal. The intermediate log signal is then operated on by a peak detector to produce a peak intermediate log signal, which is then passed through a low pass filter to produce an output strength detection signal proportional to the average of the intermediate log signal and thus proportional to the logarithin of the average strength of the diversity input signal. In another embodiment, the time-multiplexed composite signal is first detected and then passed through a squaring module, a low pass filter and then a log amplifier to produce an output indicator circuit proportional to the logarithm of the average strength of the input diversity signals.

U.S. Pat. No. 5,523,875, which is incorporated by reference in its entirety herein, discloses an AGC for use in a multichannel RF system using fiber optic links. The circuit samples the power levels from a number of attenuated RF signals simultaneously and adjusts the gain in all of the channels by the amount required to keep the highest power channel below a predetermined power level.

Patent EP1143611, which is incorporated by reference in its entirety herein, discloses a system for automatic gain control to prevent input overload by precisely controlling the input level of a received, digitally modulated signal without using a variable gain amplifier.

U.S. patent application 6,917,791, which is incorporated by reference for all purposes as if fully set forth herein, discloses a polar loop transmitter circuit arrangement that comprises a circuit input, a circuit output and a controllable signal source. A modulator is coupled between the signal source and the output, whilst a first logarithmic amplifier is provided having its input coupled to the circuit input. A second logarithmic amplifier is also provided having its output coupled to the circuit output. An output of each logarithmic amplifier is coupled to a respective input of a comparator, and an output of the comparator is coupled to an input of the modulator. The logarithmic amplifiers can be successive detection logarithmic amplifiers, such amplifiers having an RF output which is amplitude limited and can be designed to have constant phase limited output.

Patent application 20040161030, which is incorporated by reference in its entirety herein, discloses an RSSI operating at low intermediate of zero intermediate frequency is provided. The received signal strength indicator forms absolute values from an in-phase signal component and a quadrature signal component of a low or zero intermediate frequency signal that represents a received radio frequency signal. The absolute values are added. Logarithmic signal processing is performed either before absolute signal forming or after adding. Finally, low pass filtering is performed.

However, implementations of the above-referenced publications lack a system, a device, and/or method that allow determining the RSSI for a plurality of signals according to the baseband of the received signals.

SUMMARY OF SOME EMBODIMENTS OF THE INVENTION

The present invention discloses a log function generator module device that is adapted to receive substantially simultaneously a plurality of signals at a plurality of respective communication links. Such signals may have been generated, for example, by quadrature amplitude modulation (QAM).

In embodiments of the invention, the device includes a plurality of sets of amplifiers, wherein the amplifiers in each set are sequentially associated to each other such that a first amplifier in a given set is associated with a respective input of the communication links and such that each input of a next amplifier is associated with the output of a previous amplifier of the same set.

In embodiments of the invention, the device includes a plurality of negative-value-eliminator (NVE) modules being associated to the corresponding sequential output of the amplifiers, each of the NVE modules having an output, the NVE modules substantially eliminating negative signal values that are present at the output of each amplifier.

In embodiments of the invention, the device includes a plurality of preliminary adders being associated with the outputs of the NVE modules of the same sequential order, and each preliminary adder having an output, the preliminary adders summing the respective outputs of the NVE modules.

In embodiments of the invention, the device includes a plurality of limiters each having an output, wherein the limiters are associated with the outputs of the preliminary adders, respectively, and wherein the limiters perform a limiter operation.

In embodiments of the invention, the device includes a final adder having an output, wherein the final adder is associated with the output of each of the limiters and wherein the final adder sums up the signals at the output of the limiters, and wherein the output of the final adder is a final signal that substantially corresponds to a logarithm of the sum of the square of each of the received signals.

In embodiments of the invention the NVE modules are implemented by at least one of the following: squaring modules and rectifier modules.

In embodiments of the invention, the dynamic range implemented by each NVE module substantially corresponds to the ratio between the dynamic range of the signal received at a respective communication link and the number of amplifiers.

In embodiments of the invention, the final signal is substantially linear with respect to the received signals in terms of a logarithmic scale.

In embodiments of the invention, the logarithm corresponds to at least one of the following: received signal strength indication (RSSI) of the received signals; and total power of the received signals.

In embodiments of the invention, the log function generator module is associated with the output of a baseband demodulator, such that the log function generator generates the final signal according to the basebands of the received plurality of signals.

In embodiments of the invention, the log function generator module is associated with the output of antennas receiving the plurality of signals, such that the log function generator generates the final signal according to carrier frequencies of the received plurality of signals.

In embodiments of the invention, the log function generator module is associated with the output of an intermediate frequency filter, such that the log function generator module generates the final signal according to intermediate frequencies of the plurality of received signals.

In embodiments of the invention, the device further comprises a tuning circuit that is associated with the intermediate frequency filter and the log function generator module to minimize impedance mismatch effects between the intermediate frequency filter and the generator module.

In embodiments of the invention, a direct current (DC) offset cancellation mechanism is employed at the output of each amplification stage, thereby substantially eliminating static DC offset at the output of each amplifier and increasing the effective dynamic range of the log generator module.

In embodiments of the invention, the log function generator module substantially reduces power consumption in the device.

In embodiments of the invention, the log function generator module substantially reduces the time required for approximating the logarithm.

In embodiments of the invention, the log function generator module substantially increases robustness in design of the device.

In embodiments of the invention, the log function generator module substantially increases robustness of the device with regard to fabrication processes.

In embodiments of the invention, the plurality of received signals is uncorrelated to each other.

The present invention further discloses a method for approximating a logarithmic function according to a plurality of signals received at respective receiving communication links.

In embodiments of the invention, the method includes substantially performing amplification, which may be substantially linear, by a plurality of sets of sequential amplifiers on the plurality of signals, respectively, wherein each set performs at least one stage of amplification.

In embodiments of the invention, the method includes substantially eliminating negative signal values at the output of the amplifiers, thereby generating positive signals.

In embodiments of the invention, the method includes substantially summing up with preliminary adders the positive signals in correspondence to the same sequential order of the amplifiers, wherein the positive signals originate from different communication links.

In embodiments of the invention, the method includes limiting with limiters the summed positive signals thereby generating limited signals.

In embodiments of the invention, the method includes substantially summing up by a final adder the limited signals to generate at the output of the final adder a final signal that corresponds to the logarithm.

In embodiments of the invention, the amplifiers are substantially linear amplifiers.

In embodiments of the invention, the step of substantially eliminating negative signal values at the output of said amplifiers is performed by at least one of the following modules: a rectifier module and a squaring module.

In embodiments of the invention, the method includes the step of generating the final signal according to baseband signals by associating the log function generator module with the output of a baseband demodulator.

In embodiments of the invention the method includes the step of generating the final signal according to carrier frequencies of the received signals by associating the log function generator module with the receiving communication links.

In embodiments of the invention the method includes the step of generating the final signal according to intermediate frequency signals by associating the log function generator module with the output of an intermediate frequency filter.

DESCRIPTION OF SOME EMBODIMENTS OF THE INVENTION

The present invention provides a system, device and method that employ a plurality of communication links adapted to receive signals such as, e.g., $S_1, S_2, \ldots, S_N$. Each link employs a set of several sequential amplifiers, which in an embodiment of the invention are substantially linear amplifiers. Negative value signals at the output of each amplifier are substantially amplified by respective negative-value-eliminator (NVE) modules, which may be implemented, for example, by squaring modules and rectifier modules, e.g., as known in the art. Preliminary adders then sum up the signals at the outputs of the NVE modules of the same sequential order. Respective limiters limit the signals at the outputs of the preliminary adders and the signals at outputs of the limiters are further summed up to result in a final signal $S_{final}$. The final signal $S_{final}$ represents a piecewise linear approximation of the following logarithmic function:

$$f(S_1, S_2, \ldots S_N) \cong \log((S_1 + S_2^2 + \ldots |S_N^2|) = S_{final} \quad (1)$$

Equation 1 is hereinafter refers ed to as "logarithmic function".

The device, system and method described above have, inter alia, the following advantages:

a) A plurality of received signals can be processed substantially simultaneously.

b) When signals $S_1, S_2, \ldots S_N$ are being processed they remain differential such that static direct current (DC) offset cancellation can be used such as, e.g. capacitive decoupling or feedback DC cancellation loop.

c) The NVE stages are performed only after amplification. Therefore, in case squaring modules implement the NVE stages, only those circuits and/or modules that are associated with the output of said squaring modules have to be able to process signals that incorporate frequency components of twice the frequency components of the received signals. In consequence, power consumption and complexity of the amplification stages are substantially reduced.

d) The dynamic range required for each NVE module is substantially reduced. For example, if the dynamic range of $S_1$ is 60 dB and the communication link receiving said signal $S_1$ employs ten amplifiers, then each NVE module, which is associated with the output of each of the ten amplifiers, needs to have a dynamic range of 6 dB only.

e) The present invention enables approximating the logarithm of the sum of a plurality of received signals that are substantially squared or rectified.

f) The present invention can be used in multiple-input-multiple-output (MIMO) systems to detect total power for a plurality of received signals substantially simultaneously according to all baseband (BB) frequencies, radio frequencies (RF) and intermediate frequencies (IF).

g) The received signals may be uncorrelated to each other.

h) The log function generator module is more robust in reference to design and production, since space and complexity of at least some of the circuits in the generator module is reduced.

The capability of the system, device and method of the present invention to estimate the power or correspondingly the received signal strength indication (RSSI) for a plurality of signals and/or channels substantially simultaneously is of particular advantage when the received signal has a plurality of channels that carry data. Such a signal is, for example, a chrominance signal. The chrominance signal has two channels, wherein adding the two channels produces the total chrominance signal in a video or television system. The chrominance signal may be implemented by performing quadrature amplitude modulation (QAM).

Fast detection of RSSI is of particular importance to ensure efficient operation of an automatic control gain (AGC), since by increasing the speed of RSSI detection, the probability of losing data is reduced. Operational robustness and performance of the communication station is therefore substantially ameliorated.

It is to be understood that the term "signal" as specified hereinafter, may interchangeably be used with the term "channel".

It is to be understood that an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein should not be construed as limiting any applications of the invention.

Furthermore, it is to be understood that the invention can be carried out or practiced in various ways, and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers.

The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" refers to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

It is to be understood that in some embodiments of the invention, communication links as specified hereinafter may be adapted to transmit a plurality of signals substantially simultaneously over said links. Accordingly, each of the communication links specified hereinafter is adapted to transmit a plurality of communications signals substantially simultaneously to respective inputs of a communication station, module, electronic circuit and the like. Similarly, each of the communication links specified hereinafter is adapted to receive a plurality of communications signals, channels and the like, substantially simultaneously from respective outputs of another communication station, module, electronic circuit and the like.

It is further to be understood that in some aspects of the invention, each signal specified hereinafter such as, e.g., input signal $S_{IN}$ referenced in FIGS. 2 and 3, intermediate frequency signal $S_{IF}$ referenced in FIG. 3 and baseband signal $S_{BB}$ referenced in FIG. 3 and FIG. 4, may refer to or incorporate a plurality of signals. For example, baseband signal $S_{BB}$ may incorporate two channels CH1 and CH2 or two signals $S_{BB1}$ and $S_{BB2}$; and $S_{in1}$ exemplified hereinafter may not only be single signal but may also refer to a plurality of input signals.

Figure 2:
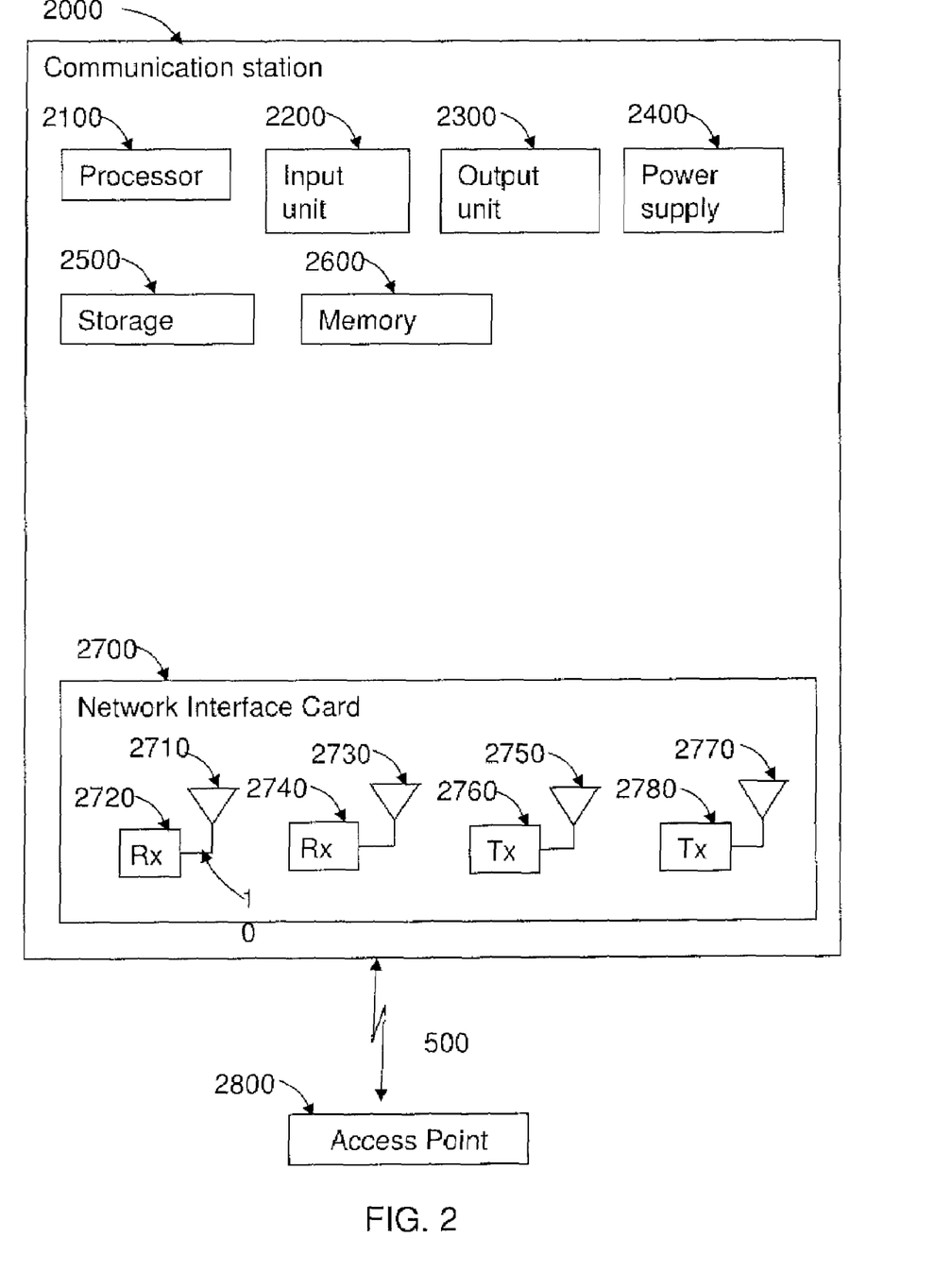
FIG. 2 is a schematic illustration of a communication station adapted to receive a plurality of signals received at a communication station (such as is shown in FIG. 1), according to an embodiment of the invention.

Reference is now made to FIG. 2. According to some embodiments of the invention, communication station (hereinafter referred to as "station") 2000 includes a processor 2100, an input unit 2200, an output unit 2300, a storage 2500 and a memory 2600, all of which are associated with a power supply 2400. Station 2100 may further include at least one antenna such as, e.g., antenna 2710, 2730, 2750 and 2770. Antennas 2710 and 2730 are associated with receivers 2720 and 2740, and antennas 2750 and 2770 are associated with transmitters 2760 and 2780, respectively. Receivers 2720 and 2740 as well as transmitters 2760 and 2780 may be included in a network interface card (NIC) 2700. Power supply 2400 may be associated with receivers 2720 and 2740, as well as with transmitters 2760 and 2780. Receiver 2720 and/or 2740 as well as transmitter 2760 and/or 2780 may be implemented as a transceiver, a transmitter receiver, and the like.

According to some embodiments of the invention, antenna 2710 may receive, via a communication link 500 a signal $S_{in1}$ Signal Si, is sent from antenna 2710 to receiver 2720 via communication link 10.

Upon receiving signal $S_{in}$, receiver 2720 estimates the logarithmic function in order to perform, for example, AGC.

Storage 2500 and/or memory 2600 may store instructions. Executing the instructions by processor 21 00 and/or by a processor (not shown) embedded in NIC 2700, may result in an application that, inter alia, displays at output unit 2300 information that represents the data carried by signal $S_{in}$. For example, the application may display a video sequence at output unit 2300.

Figure 3:
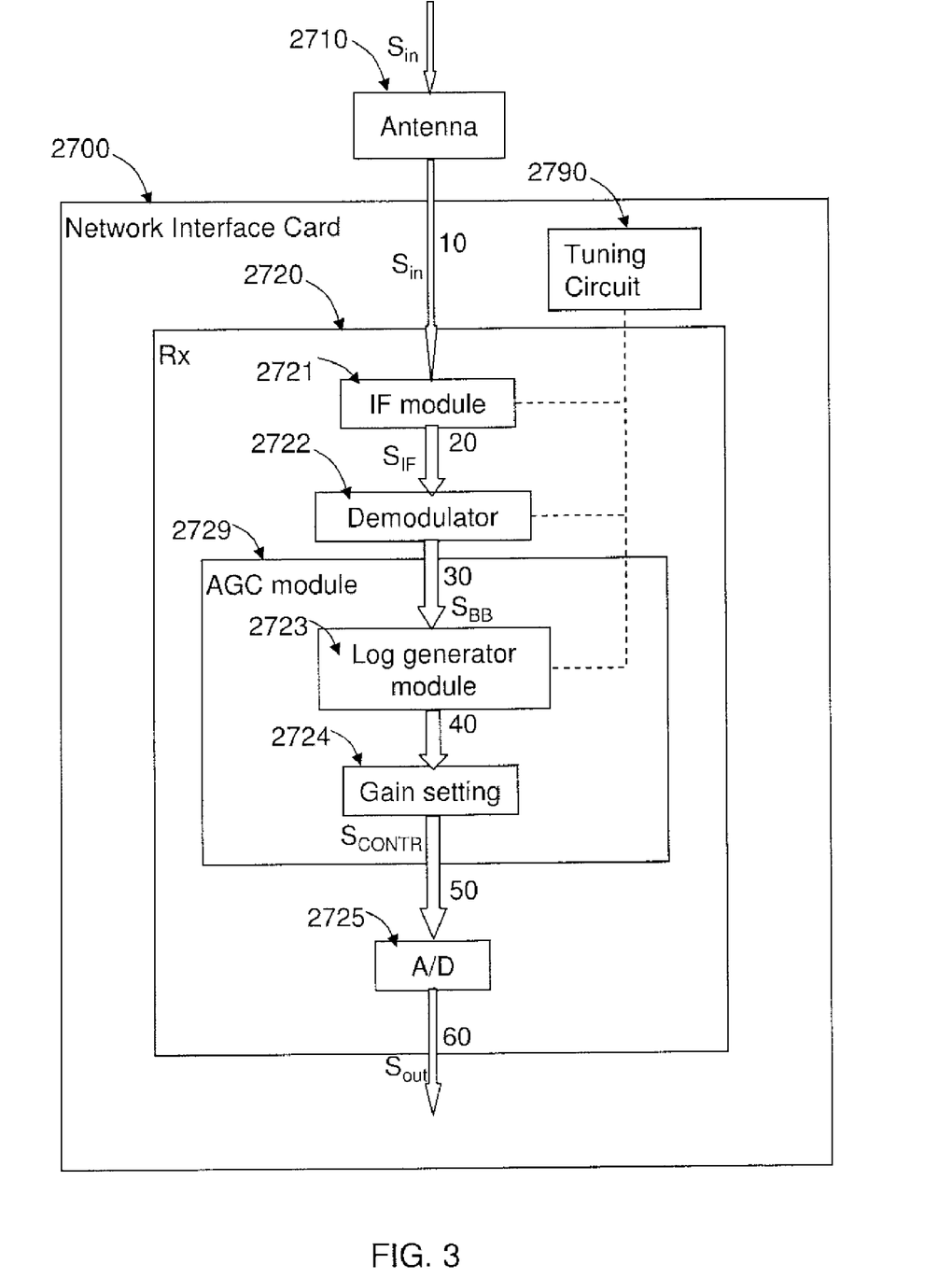
FIG. 3 is a schematic block diagram illustration of signal transmission in a network interface card, according to an embodiment of the invention.

Reference is made to FIG. 3. It is to be understood that the architecture of receiver 2720 as specified herein is for exemplary purposes only to demonstrate one application of a log function generator module 2723, i.e., a log function generator 2723 as specified herein may be used for other hardware and/or software applications and may be embedded in a hardware environment different from the one specified herein.

According to some embodiments of the invention, receiver 2720 may have, for example, a superheterodyne architecture. Accordingly, receiver 2720 may include an intermediate frequency (IF) filter 2721 for shifting the frequency of signal $S_{in}$ to the IF to a signal $S_{IF}$ having said IF. IF module 2721 may be implemented, e.g., as known in the art. Signal $S_{IF}$ may then be sent over communication link 20 to a baseband demodulator 2722, which is adapted to demodulate the baseband signal $S_{BB}$ from signal $S_{IF}$. The signal $S_{BB}$ is sent via communication link 30 to the log function generator module 2723, which estimates the logarithmic function according to signal $S_{BB}$. Function generator module 2723 may be embedded in an AGC module 2729. It is to be understood that NIC 2700 may be adapted such that logarithmic function module 2723 can estimate the logarithmic function according to $S_{IN}$ and $S_{IF}$, i.e., according to radio and intermediate frequencies as outlined later below.

According to an embodiment of the invention, log function generator module 2723 employs an amplification circuit, as will be described below with reference to FIG. 4 and FIG. 5.

According to some embodiments of the invention, AGC module 2729 includes the step of Gain Setting 2724 on $S_{BB}$ according to the RSSI estimated by log function generator module 2723. ACC is performed, e.g., as known in the art, such that the power of signal $S_{CONTR}$ at the output of AGC module 2729 remains substantially constant despite variations in strength of signal $S_{BB}$. Accordingly, the higher the estimated value of $RSS_1$, the lower is the gain applied by AGC module 2729 on signal $S_{BB}$.

Signal $S_{CONTR}$ may then be sent via communication link 50 to an analog to digital (A/D) conversion module 2725 (hereinafter referred to as A/D module). A/D conversion of signal $S_{CONTR}$ may be performed, e.g., as known in the art. Signal $S_{out}$ of A/D module 2725 may be sent via, e.g., communication link 60 to one or more processing units such as, for example, processing unit 2100.

Figure 4:
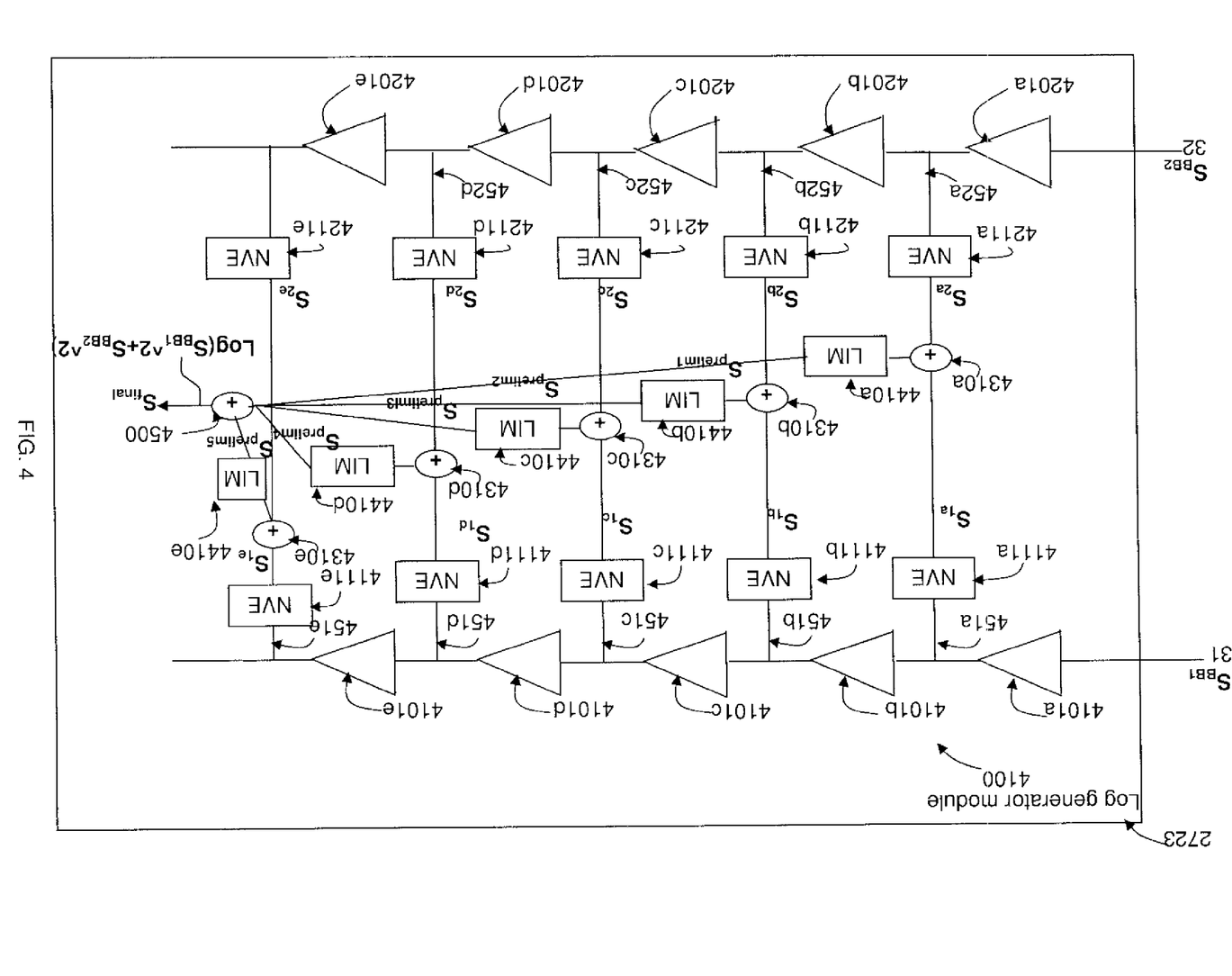
FIG. 4 is a schematic block diagram illustration of an amplification circuit, according to an embodiment of the invention.

Reference is now made to FIG. 4. According to some embodiments of the invention, amplification circuit (hereinafter referred to as "circuit") 4100 has a plurality of inputs adapted to receive respective signals via communication link 30. For exemplary purposes only, the plurality of inputs is hereinafter referred to as input 31 and input 32 and baseband signal $S_{BB}$ may incorporate a plurality of signals $S_{BB1}$, $S_{BB2}$, ..., $S_{BBn}$. For exemplary purposes only, the plurality of signals is hereinafter referred to signals $S_{BB1}$ and $S_{BB2}$ only.

According to some embodiments of the invention, each input 31 and 32 are associated with a plurality of amplifiers, which are substantially linear amplifiers For exemplary purposes only, amplifiers associated with input 31 are herein referred to as amplifiers 4101a-4101e, (i.e., five amplifiers), and amplifiers associated with input 32 are herein referred to as amplifiers 4201a-4201e (i.e., five amplifiers). However, it is to be understood that both input 31 and 21 may employ fewer or more amplifiers. Amplifiers 4101a-e and amplifiers 4201a-4201e are associated to each other in series.

Each output of amplifiers 4101a, 4101b, 4101c, 4101d and 4101e is associated via taps 451a, 451b, 451c, 451d and 451e with NVE modules 4111a, 4111b, 4111c, 4111d and 4111e, respectively. Similarly, each output of amplifiers 4201a, 4201b, 4201c, 4201d and 4201e is linked via taps 452a, 452b, 452c, 452d and 452e to NVE modules 4211a, 4211b, 4211c, 4211d and 4211e, respectively. It is to be understood that in some embodiments of the invention, a rectifier module, which may be implemented by a rectifier circuit, may replace each or some of the NVE modules.

According to an embodiment of the invention, amplification of $S_{BB1}$ and $S_{BB2}$ is performed in five stages as outlined below by two sets of sequential amplifiers.

At the first stage, $S_{BB1}$ is amplified by amplifier 4101a and negative signals values are substantially eliminated by a NVE modules 4111a, resulting in a signal $S_{1a}$. Similarly, $S_{BB2}$ is amplified by amplifier 4201a and negative signal values at the output of amplifier 4201a are substantially eliminated by a NVE module 4211a, resulting in a signal $S_{2a}$. Signals $S_{1a}$ and $S_{2a}$ are summed up via preliminary adder 4310a and the resulting signal is transmitted via limiter 4410a, whose output signal is denoted $S_{prelim1}$ to adder 4500.

At the second stage, amplifier 4101b amplifies the output of amplifier 4101a. Negative signals values at the output of amplifier 4101b are substantially eliminated by a NVE module 4111b, resulting in a signal $S_{1b}$. Similarly, amplifier 4201b amplifies the output of amplifier 4201a. Negative signals values at the output of amplifier 4201b are substantially eliminated by a NVE module 4211b, resulting in a signal $S_{2b}$. Signals $S_{1b}$ and $S_{2b}$ are summed up via preliminary adder 4310b and the resulting signal is transmitted via limiter 4410b, whose output is signal is denoted $S_{prelim2}$, to adder 4500.

At the third stage, amplifier 4101c amplifies output of amplifier 4101b. Negative signals values at the output of amplifier 4101c are substantially eliminated by a NVE module 4111c, resulting in a signal $S_{1c}$. Similarly, output of amplifier 4201b is amplified by amplifier 4201c. Negative signals values at the output of amplifier 4201c are substantially eliminated by a NVE module 4211c, resulting in a signal $S_{2c}$. Signals $S_{1c}$ and $S_{2c}$ are summed up via preliminary adder 4310c and the resulting signal is transmitted via limiter 4410c, whose output signal is $S_{prelim3}$, to adder 4500.

At the fourth stage, amplifier 4101d amplifies the output of amplifier 4101c and negative signals values at the output of amplifier 4101d are substantially eliminated by a NVE module 4111d. The output of NVE module 4111d is hereinafter referred to as "signal $S_{1d}$". Similarly, amplifier 4201d amplifies output of amplifier 4201c, and negative signal values at the output of amplifier 4201d are substantially eliminated by a squaring module 4211d, resulting in a signal $S_{2d}$. Signals $S_{1d}$ and $S_{2d}$ are summed up via preliminary adder 4310d and the resulting signal is transmitted via limiter 4410d, whose output signal is $S_{prelim4}$, to adder 4500.

At the fifth stage, amplifier 4101e amplifies the output of amplifier 4101d and negative signals values at the output of amplifier 4101e are substantially eliminated by a NVE module 4111e. The output of NVE module 4111e is hereinafter referred to as "signal $S_{1e}$". Similarly, amplifier 4201c amplifies output of amplifier 4201e, and negative signal values at the output of 4201e are substantially eliminated by a squaring module 4211e, resulting in a signal $S_{2e}$. Signals $S_{1e}$ and $S_{2e}$ are summed up via preliminary adder 4310e and the resulting signal is transmitted via limiter 4410e, whose output signal is $S_{prelim5}$, to adder 4500.

According to an embodiment of the invention, a final adder 4500 sums up signals $S_{prelim1}$, $S_{prelim2}$, $S_{prelim3}$, $S_{prelim4}$, and $S_{prelim5}$ whereby the output signal $S_{final}$ of final adder 4500 corresponds to an estimation of the logarithmic function, which may be used as an indicator of the total power or the RSSI of signals $S_{BB1}$ and $S_{BB2}$. Furthermore, the output of final adder 4500 is substantially linear with respect to a logarithmic scale to signals $S_{BB1}$ and $S_{BB2}$.

The relationship between the RSSI and the plurality of input signals $S_{BB1}, \ldots, S_{BBn}$ may be described, for example, by the following equation:

$$RSSI \propto C + I_L \log(S^2_{BB1} + \ldots + S^2_{BBn}) \qquad (2)$$

wherein the term C may depend on the number of amplification stages N in each communication link, the amplification A of each amplifier, and/or the current output limit $I_L$ at the last amplifier (e.g., amplifier 4101e and amplifier 4201e) of each communication link.

Other equations may be used to describe the relations between RSSI and the plurality of signals signals $S_{BB1}, \ldots, S_{BBn}$. As can readily be seen from equation 1, the RSSI is substantially linear with respect to a logarithmic scale with the signals $S_{BB1}$ and $S_{BB2}$.

According to some embodiments of the invention, a DC offset cancellation mechanism (not shown) such as, e.g., an AC decoupling mechanism, may be employed at the output of each amplification stage. Thusly configured, static (DC) offset at the output of NVE module 4111a to 4111e and at the output of NVE module 4211a to 4211e is substantially eliminated and the effective dynamic range of the log generator module 2723 is substantially increased.

According to an alternative embodiment of the invention, log function generator module 2723 may be placed between IF module 2721 and baseband demodulator 2722. Accordingly, log function generator module 2723 and baseband demodulator 2722 process signal $S_{IF}$. Since signal $S_{IF}$ has a higher frequency than signal $S_{BB}$, operating log function generator module 2723 and baseband demodulator 2722 may be more power consuming and more complicated than in embodiments in which log function generator module 2723 is placed after baseband demodulator 2722. Nevertheless, this embodiment is still superior to systems and methods used in the art, since log function generator module 2723 is adapted to estimate the RSSI for a plurality of signals in receiver 2720 substantially simultaneously.

According to yet another embodiment of the invention, log function generator module 2723 may be placed between WE module 2721 and antenna 2710. Accordingly, both IF module 2721 and baseband demodulator 2722 process signal $S_{in}$. Since the frequency of signal $S_{IN}$, which may incorporate a carrier frequency, is substantially higher than signal $S_{BB}$, log function generator module 2723 and baseband demodulator 2722 consume significantly more power and operate slower than in embodiments in which log function generator module 2723 is placed after antenna 2710, IF module 2721 and baseband demodulator 2722. Nevertheless, this embodiment is still superior to systems used in the art, since log function generator module 2723 is adapted to approximate the logarithmic function for a plurality of signals $S_{IN}$ substantially simultaneously. Correspondingly, module 2723 is adapted to estimate the RSSI (which corresponds to the total power of $S_{in}$) for a plurality of signals substantially simultaneously.

According to some embodiments of the invention, squaring modules 4111a to 4111e and squaring modules 4211a to 4211e may be replaced by rectifier modules, e.g., as known in the art. This is possible since the dynamic range required herein for substantially eliminating negative signal values is relatively low and due to the fact that rectifying as used herein on signals having a relatively small amplitude renders a correspondingly small error as well.

According to some embodiments of the invention, NIC 2700 includes a tuning circuit 2790, e.g., as known in the art, which may be associated alone or in any combination with IF module 2721, baseband demodulator 2722 and log function generator module 2723. Tuning circuit 2790 is adapted to adjust components of IF module 2721, demodulator 2722 and/or log function generator module 2723 such that the components are responsive to frequencies within a certain bandwidth, thereby minimizing impedance mismatch effects which may occur between IF module 2721, demodulator 2722 and/or log function generator module 2723.

According to some embodiments of the invention, the number of amplifiers employed per input in log function generator module 2723 may vary depending on the dynamic range of the signals expected to be received at each input. More amplifiers per input increase the dynamic range at which log function generator module 2723 is operable, whereby fewer amplifiers per input reduces the dynamic range at which log function generator module 2723 is operable. It is to be understood that adding and removing of amplifiers should be performed such that the number amplifiers per input is equal.

Figure 5:
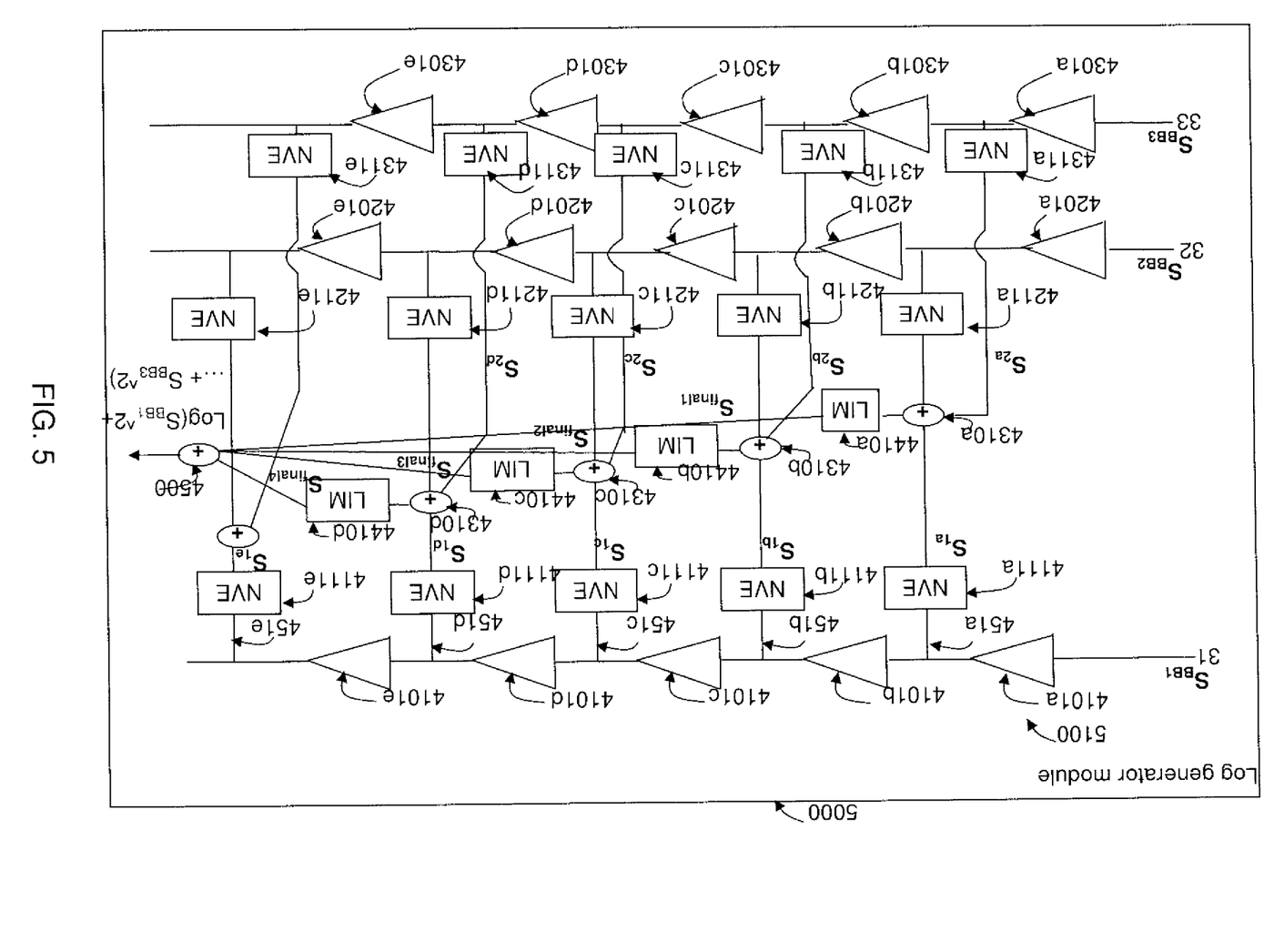
FIG. 5 is a schematic block diagram illustration an amplification circuit, according to another embodiment of the invention.

Reference is now made to FIG. 5. As already mentioned above, a circuit may be adapted to estimate the logarithmic function and, as a result, the RSSI thereof for more than two inputs. For example, a RSSI module 5000 that includes a circuit 5100 may be adapted to receive three signals $S_{BB1}$, $S_{BB2}$ and $S_{BB3}$ via inputs 31, 32 and 33, respectively, and to perform amplification of said three signals substantially simultaneously. As a result, the RSSI for signals $S_{BB1}$, $S_{BB2}$ and $S_{BB3}$ is estimated.

By reducing the complexity of the electronic circuits as schematically illustrated in FIG. 4 and FIG. 5, circuits 4100 and 5100 are more process and design tolerant.

Figure 6:
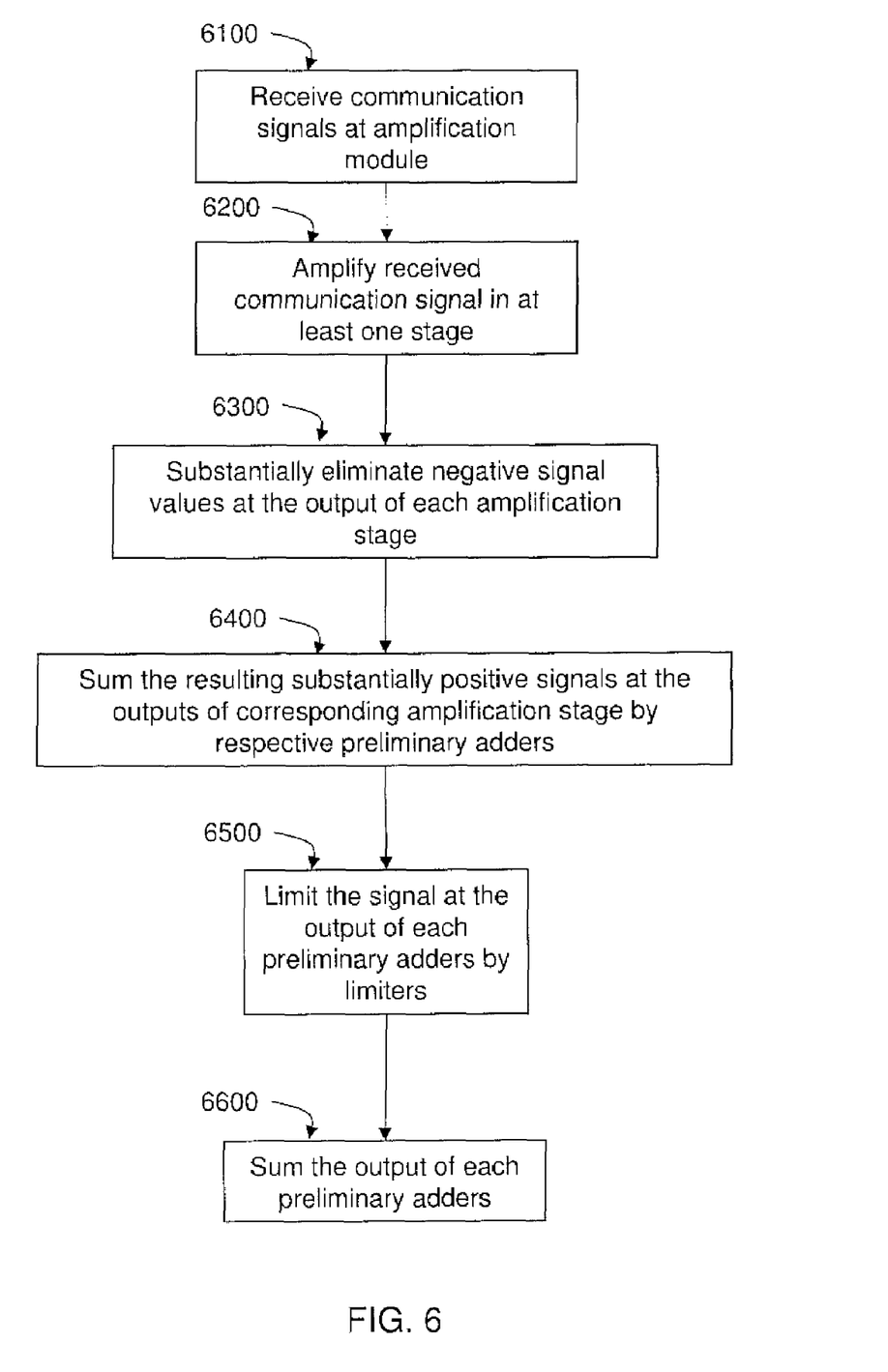
FIG. 6 is a schematic flow-chart illustration of a method that enables approximating the logarithm of the sum of the square of each signal received at the communication station, according to an embodiment of the invention.

Reference is now made to FIG. 6. The method that enables approximating the logarithm of the sum of the square of each signal received at the communication station may include, as indicated by box 6100, the step of receiving at a log function generator module a plurality of communications signals. For example, circuit 4100 may receive two signals $S_{BB1}$ and $S_{BB2}$ and circuit 5100 may receive three signals $S_{BB1}$, $S_{BB2}$ and $S_{BB3}$.

As indicated by box 6200, the method may include, for example, the step of amplifying each of the received signals in at least one stage. For example, signal $S_{BB1}$ may undergo a first, a second, a third, a fourth and a fifth amplification stage at amplifiers 4101a, 4101b, 4101c, 4101d and 4101e, respectively. Similarly, signal $S_{BB2}$ may undergo a first, a second, a third, a fourth and a fifth amplification stage at amplifiers 4201a, 4201b, 4201c, 4201d and 4201e, respectively.

As indicated by box 6300, the method may include, for example, the step of substantially eliminating negative signals at the output of each amplification stage by respective NVE modules. For example, negative signal values at the output of amplifier 4101a, amplifier 4101b, amplifier 4101c, amplifier 4101d and amplifier 4101e are substantially eliminated by NVE modules 4111a, 4111b, 4111c, 4111d and 4111e, respectively. Similarly, negative signal values at the output of amplifier 4201a, amplifier 4201b, amplifier 4201c, amplifier 4201d and amplifier 4201e are substantially eliminated by NVE modules 4211a, 4211b, 4211c, 4211d and 4211e, respectively. In some embodiment of the invention, NVE modules 4111a, 4111b, 4111c, 4111d 4111e, 4211a, 4211b, 4211c, 4211d and 4211e may be implemented, for example, by squaring circuits and rectifier circuits, e.g., as known in the art.

As indicated by box 6400, the method may include, for example, the step of summing the resulting signals that correspond to the same amplification stage, according to an embodiment of the invention. For example, signal output of NVE modules 4111a, 4111b, 4111c, 4111d and 4111e is added to the signal output of NVE modules 4211a, 4211b, 4211c, 4211d and 4211e, respectively. Summing may be performed for each stage by preliminary adders 4310a, 4310b, 4310c, 4310d and 4310e, respectively.

As indicated by box 6500, the method may include, for example, the step of limiting the signals at the outputs of said preliminary adders with respective limiters. Limiting of the signals at the output of adders 4310a-e is performed by limiters 4410a-e, respectively.

As indicated by box 6600, the method may include, for example, the step of summing the output of said limiters by employing a final adder. For example, the output of adders 4310a, 4310b, 4310c, 4310d and 4310e may be added by employing adder 4500. The output of the final adder is substantially linear in a logarithmic scale with respect to the signals received at the log function generator module.

Examples of communication terminal 2000 (FIG. 2) may include, without limitations, one way and/or two-way radio communication systems, a cellular radio-telephone communication system, a cellular telephone, a wireless telephone, a Personal Communication Systems (PCS) device, a PDA device that incorporates a wireless communication device, a tablet computer, a server computer, a personal computer, a wireless modem, a wireless communication device, a wireless Access Point (AP) such as, e.g., AP 2800, a modem, a transmitter, a receiver, a transceiver, a transmitter-receiver, a wireless communication station, a mobile computer, a notebook computer, a desktop computer, a laptop computer a Personal Digital Assistant (PDA) device.

Non-limiting examples of processor 2100 include a chip, a microprocessor, a controller, a Central Processing Unit (CPU), a Digital Signal Processor (DSP), a microchip, an Integrated Circuit (IC), or any other suitable multi-purpose or specific processor or controller.

Non limiting embodiments of antennas 2710, 2730, 2750 and 2770 include an internal and/or external RF antenna, whereby each of antennas 2710, 2730, 2750 and 2770 may include a micro-strip antenna, an omni-directional antenna, a diversity antenna, a dipole antenna, a monopole antenna, an end fed antenna, a circularly polarized antenna, or any other type of antenna suitable for sending and/or receiving wireless signals, blocks, frames, transmission streams, packets, messages and/or data.

Input unit 2200 may be a keyboard, a touch pad, a touch screen, a mouse, a tracking device, a pointing device, or any other suitable input device.

Output unit 2300 may be a liquid crystal display (LCD), a cathode ray tube (CRT) monitor, or any other suitable output unit.

Storage 2500 may be a hard disk drive, a floppy disk drive, a Compact Disk (CD) drive, a CD-ROM drive, a digital versatile disc (DVD) drive, or other suitable removable or non-removable storage units.

Memory 2600 may be a Random Access Memory (RAM), a Dynamic RAM (DRAM), a Synchronous DRAM (SD-RAM), a Flash memory, a volatile memory, a non-volatile memory, a cache memory, a buffer, a short-term memory unit, a long-term memory unit, or other suitable memory units or storage units.

It should be noted that embodiments of the invention may be used in a variety of applications. Non-limiting examples of embodiments of the invention include the usage of the invention in conjunction with many networks. Non-limiting examples of such networks include a wide area network (WAN), local area network (LAN), a global communication network, e.g., the Internet, a wireless communication network such as, for example, a wireless LEAN (WLAN) communication network, a wireless virtual private network (VPN), a Bluetooth network, a cellular communication network, for example, a $3^{rd}$ Generation Partnership Project (3GPP), such as, for example, a Global System for Mobile communications (GSM) network, a Wideband Code Division-Multiple Access (WCDMA) cellular communication network, a Frequency Domain Duplexing (FDD) network, and the like.

It is to be understood that some embodiments of the invention may be implemented, for example, using a machine-readable medium or article which may store an instruction or a set of instructions that, if executed by a machine, cause the machine to perform a method or operations or both in accordance with embodiments of the invention. Such a machine may include, for example, any suitable processing platform, computing platform, computing device, processing device, computing system, processing system, computer, processor, or the like, and may be implemented using any suitable combination of hardware or software or both. The machine-readable medium or article may include but is not limited to, any suitable type of memory unit, memory device, memory article, memory medium, storage article, storage device storage medium or storage unit such as, for example, memory, removable or non-removable media, erasable or non-erasable media, writeable or re-writeable media, digital or analog media, optical disk, hard disk, floppy disk, Compact Disk Recordable (CD-R), Compact Disk Read Only Memory (CD-ROM), Compact Disk Rewriteable (CD-RW), magnetic media, various types of Digital Versatile Disks (DVDs), a tape, a cassette, or the like. The instructions may include any suitable type of code, for example, an executable code, a compiled code, a dynamic code, a static code, interpreted code, a source code or the like, and may be implemented using any suitable high-level, low-level, object-oriented, visual, compiled or interpreted programming language. Such a compiled or interpreted programming language may be, for example, C, C++, Java, Pascal, MATLAB, BASIC, Cobol, Fortran, assembly language, machine code and the like.

J Some embodiments of the invention may be implemented by software, by hardware, or by a combination thereof.

While the invention has been described with respect to a limited number of embodiments, these should not be construed as limitations on the scope of the invention, but rather as exemplifications of some of the embodiments. Those skilled in the art will envision other possible variations, modifications, and programs that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A log function generator module device that is adapted to simultaneously receive a plurality of signals at a plurality of respective communication links, said device comprising:

a plurality of sets of amplifiers, wherein the amplifiers in each set are sequentially associated to each other such that a first amplifier in a given set is associated with a respective input of said communication links and such that each input of a next amplifier is associated with the output of a previous amplifier of the same set;

a plurality of negative-value-eliminator (NVE) modules being associated to the corresponding sequential output of said amplifiers, each of the NVE modules having an output, said NVE modules eliminating negative signal values that are present at the output of each amplifier;

a plurality of preliminary adders being associated with the outputs of the NVE modules of the same sequential order, and each preliminary adder having an output, said preliminary adders summing the respective outputs of said NVE modules;

a plurality of limiters each having an output, wherein said limiters are associated with the outputs of said preliminary adders respectively, and wherein said limiters perform a limiter operation; and a final adder having an output, wherein said final adder is associated with the output of each of said limiters and wherein said final adder sums up the signals at the output of said limiters, and wherein the output of said final adder is a final signal that corresponds to a logarithm of the sum of the square of each of said received signals, wherein said log function generator module device is associated with the output of an intermediate frequency filter, such that said log function generator module device generates said final signal according to intermediate frequencies of said plurality of received signals, and wherein said log function generator module device further comprises a tuning circuit that is associated with said intermediate frequency filter and said log function generator module device to minimize impedance mismatch effects between said intermediate frequency filter and said log function generator module device.

\* \* \* \* \*